United States Patent Office 3,048,633
Patented Aug. 7, 1962

3,048,633
N-LOWER ALKYL-2-(BENZYLOXATEDPHENYL)-GLYCOLAMIDE
Peter B. Russell, Villanova, and Scott J. Childress, Newtown Square, Pa., assignors to American Home Products Corporation, New York, N.Y., a corporation of Delaware
No Drawing. Filed Dec. 2, 1960, Ser. No. 73,449
5 Claims. (Cl. 260—559)

This invention relates to a new and improved method of preparing ring-hydroxylated 1-aryl-2-alkylaminoethanols, and to new intermediate compounds useful in this new synthetic method. A number of ring-hydroxylated 1-aryl-2-alkylaminoethanols have been found in recent years to have valuable pharmacological properties and have come into widespread use in medicine. Unfortunately, the methods hitherto available for their synthesis have been complicated and expensive, so that the cost of these valuable medicines has remained high. This invention provides a simple and inexpensive process of preparing these medically useful compounds. The ring-hydroxylated 1-aryl-2-alkylaminoethanols produced by our new synthesis may be represented by the formula:

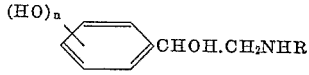

(which may be conveniently abbreviated as

where $n$ is 1 or 2 and wherein R is a lower alkyl radical, such as methyl, ethyl, propyl, isopropyl, butyl, etc. In many instances, it is preferred to employ these compounds in the form of their pharmaceutically acceptable salts, such as the hydrochloride, hydrobromide, sulfate, tartrate, maleate, citrate, etc. Conversion of the bases to the corresponding salts, and conversion of one of these salts to another is easily effected by methods already familiar to skilled chemists, and is not considered a part of this invention.

The new synthetic route employs the series of reactions outlined schematically as follows:

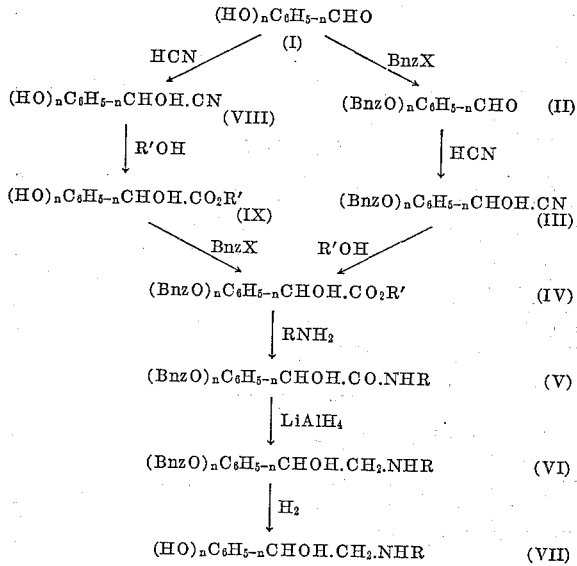

As will be seen, this synthesis calls for the conversion of a hydroxylated benzaldehyde (I), by either of two routes, to a ring-benzyloxylated mandelic ester. We prefer to effect this transformation by first etherifying the hydroxybenzaldehyde (I) by treatment with benzyl chloride or bromide in the presence of a base, obtaining a ring-benzyloxylated benzaldehyde (II); second, adding HCN to this etherified aldehyde to obtain the benzyloxylated mandelonitrile (III); and third, conversion of this nitrile to the corresponding ester (IV) by heating with an alcohol and a mineral acid, followed by hydrolysis of the iminoether intermediate with water. Alternatively, however, the hydroxyaldehyde (I) may be subjected to cyanohydrination to yield the hydroxylated mandelonitrile (VIII) which is then converted to the mandelic ester (IX) which on benzylation is converted into IV.

Compound IV is mixed with at least an equivalent amount of the appropriate alkyl primary amine, heated if desired to promote amidation, and the ring-benzyloxylated mandelamide (V) is obtained. This is subjected to reduction in an ether-type solvent with lithium aluminum hydride to yield a ring-benzyloxylated 1-aryl-2-alkylaminoethanol (VI). Catalytic hydrogenation, employing either a nickel or palladium catalyst, removes the benzyl groups and yields the desired ring-hydroxylated 1-aryl-2-alkylaminoethanol which may be recovered either as the free base or as a salt such as the hydrochloride.

Suitable aldehyde starting materials (Formula I) include salicylaldehyde, m-hydroxybenzaldehyde, p-hydroxybenzaldehyde, 3,4-dihydroxybenzaldehyde, etc. The benzylation with benzyl chloride or benzyl bromide is effected in the presence of an acid acceptor, preferably a base such as sodium ethylate, sodium hydroxide, or potassium carbonate. Cyanohydrination is preferably effected with liquid hydrogen cyanide in the presence of a small amount of concentrated aqueous sodium cyanide solution which appears to act as a catalyst. Conversion of the cyanohydrin (Formula III) to the mandelic ester (IV) is preferably carried out by dissolving the cyanohydrin in a mixture of ether and a lower alcohol and then passing in anhydrous hydrogen chloride while cooling the mixture. Almost any lower alcohol may be used. For reasons of convenience, economy, and availability, we prefer to use methanol or ethanol. As is well known, an iminoether intermediate is formed which on treatment with water is converted to the alkyl mandelic ester, which may then be ether-extracted, washed, dried, concentrated and distilled. Conversion of the mandelic ester (IV) to the mandelamide (V) may be carried out as indicated above merely by heating the ester with the appropriate alkyl primary amine until the amidation reaction is completed. Heating for an hour or so in methyl or ethyl alcohol at refluxing temperatures is ordinarily sufficient. Suitable alkyl primary amines for use in our process include methylamine, ethylamine, isopropylamine, propylamine and butylamine.

It will be noted that the compounds of stages III, IV, V, VI, VII, VIII, and IX all possess an asymmetric carbon atom. Accordingly, these compounds as produced by the sequences of reactions here shown and exemplified will each be a mixture of the dextro- and levo-rotatory forms. If desired, resolution may be effected at any stage by means well known to skilled chemists. In many instances, the dl- mixtures are useful without resolution.

Although, as stated above, we prefer to prepare the substituted benzaldehyde cyanohydrins by treating the appropriate benzaldehyde with anhydrous hydrogen cyanide in the presence of a little sodium cyanide solution to serve as a catalyst, we are by no means limited to this method. We can, instead, use hydrogen cyanide generated in situ by mixing the aldehyde, preferably dissolved in a suitable solvent such as a lower alcohol, with sodium cyanide and then adding a strong acid, preferably hydrogen chloride. By employing this procedure it is possible to perform the steps of cyanohydrination, iminoether formation, and ester formation virtually in a single process step. An instance of this process variant is shown in Example 18, below; this, it will be recognized, avoids the use of liquid hydrogen cyanide and is accordingly somewhat less hazardous than the methods employing this reagent. However, when handled with due precautions, liquid hydrogen cyanide need not be considered unduly hazardous. The choice between use of liquid hydrogen cyanide and hydrogen cyanide formed in situ from an alkali metal cyanide and a strong acid may be based on consideration of availability of materials and equipment, the costs prevailing at a particular time and place, and personal preference.

Cyanohydrination of the substituted benzaldehydes may be conducted at temperatures between $-10°$ C. and $+50°$ C., but we prefer to operate in the range of from $0°$ to $20°$.

Reduction of the amide to the amine (V→VI) by lithium aluminum hydride is best carried out in an ether-type solvent, such as diethyl ether, dibutyl ether, dioxan, or tetrahydrofuran. Because of its superior solvent powders, and relatively slight inflammability, we prefer tetrahydrofuran.

The ring-benzloxylated N-alkylmandelamides of this invention are solid compounds readily obtained in good yields and are easily purified by crystallization from common solvents such as ether and alcohol.

The invention is illustrated by the following examples:

*Example 1*

A mixture of 244 g. of 3-hydroxybenzaldehyde and 260 g. of benzyl chloride in 1400 ml. of alcohol in which 46 g. of sodium had been dissolved was heated under reflux for one hour. The precipitated sodium chloride was filtered off, the solvent was concentrated and the residue distilled to give 3-benzyloxybenzaldehyde, B.P. 153–155/0.6 mm.

*Example 2*

3-benzyloxybenzaldehyde (53 g.) was mixed with hydrogen cyanide (9 g.) and 0.5 ml. of saturated aqueous sodium cyanide solution was added. The mixture warmed up sharply. Ether (50 ml.) and methanol (10 g.) were added and hydrogen chloride (10 g.) was passed in with cooling. Crystallization of the iminoether occurred suddenly. The filtered product melted at 87–92°. It was placed in 500 ml. of water and shaken with ether until all had dissolved (ca. 1 hr.). The ether extract was washed with water, dried, concentrated, and distilled to give methyl 3-benzyloxymandelate, B.P. 190–197°/0.7 mm. Crystallized from ether, it melted at 76–78° C. Analysis—calculated for $C_{16}H_{16}O_4$: C, 70.58; H, 5.92. Found: C, 70.40; H, 5.91.

*Example 3*

Hydrogen cyanide (20 g.) and 3-benzyloxybenzaldehyde (120 g.) were mixed with 1 ml. of saturated aqueous sodium cyanide solution. The mixture became hot, and after cooling, 300 ml. of methanol was added, followed by 40 g. of hydrogen chloride (with cooling). A spontaneous warming was observed. After standing overnight, the solution was concentrated, the product was diluted out with water, taken up in ether and worked up as in Example 2 to give methyl 3-benzyloxymandelate.

*Example 4*

Methyl 3-hydroxymandelate (18.2 g.), sodium iodide (1.5 g.), benzyl chloride (13 g.) and sodium carbonate (10.6 g.) were heated in refluxing acetone for 24 hours. After filtration the solution was concentrated, taken up in ether, washed with 5% sodium hydroxide, dried, and reconcentrated. The residue was crystallized from hexane to give methyl 3-benzyloxymandelate.

*Example 5*

A solution of 41.5 g. of methyl 3-benzyloxymandelate and 10 g. of methylamine in 100 ml. of alcohol was heated several hours at 70°. The solvent was concentrated and ether added to residue to afford 3-benzyloxy-N-methylmandelamide which, after recrystallization from alcohol-ether, melted at 101–102°. Analysis—calculated for $C_{16}H_{17}O_3N$: C, 70.83; H, 6.32; N, 5.16. Found: C, 70.84; H, 6.25; N, 5.15.

*Example 6*

Lithium aluminum hydride (29 g.) was suspended in 600 ml. of tetrahydrofuran and a solution of 100 g. of 3-benzyloxy-N-methylmandelamide in 200 ml. of tetrahydrofuran slowly added. After refluxing overnight the mixture was cooled and water was added cautiously to decompose the excess reagent. The precipitate was filtered off and washed several times with hot solvent. The filtrates were evaporated to leave 1-(3'-benzyloxyphenyl)-2-methylaminoethanol which, after recrystallization from alcohol, melted at 103–105°. Analysis—calculated for $C_{16}H_{19}O_2N$: C, 74.68; H, 7.44. Found: C, 74.91; H, 7.16. This product formed a hydrochloride, M.P. 150–153° (from alcohol-ether). It was also possible to obtain a lower melting form, 138–140°, that changed to the higher melting form on resolidification. Analysis—calculated for $C_{16}H_{19}O_2N \cdot HCl$: C, 65.41; H, 6.86; N, 4.77. Found: C, 65.24; H, 6.83; N, 4.76.

*Example 7*

Nine grams of 3-benzyloxy-N-methylmandelamide was placed in a Soxhlet thimble over a solution of 4.5 g. of lithium aluminum hydride in 200 ml. of ether. Under reflux, the extraction was sufficiently slow to keep the reaction under control. After 20 hours, the extraction was complete and the mixture was cooled and cautiously treated with water. The precipitate was filtered off and extracted with hot benzene. The combined filtrates were evaporated to leave 1-(3'-benzyloxyphenyl)-2-methylaminoethanol, M.P. 103–105°, identical with the product of Example 6.

*Example 8*

Twelve grams of 1-(3'-benxyloxyphenyl)-2-methylaminoethanol hydrochloride in 60 ml. of methanol containing 2.5 ml. of 10% alcoholic hydrogen chloride was hydrogenated in the presence of 1.2 g. of 5% palladium-charcoal until one equivalent of hydrogen had been consumed. The catalyst was removed (it was reusable) and the solution concentrated. Addition of ether gave crystals of DL-phenylephrine hydrochloride, or 1-(3'-hydroxyphenyl)-2-methylaminoethanol hydrochloride.

*Example 9*

A mixture of 90 g. of 3,4-dihydroxybenzaldehyde, 175 g. of potassium carbonate and 171 g. of benzyl chloride in one liter of acetone was stirred and heated under reflux for 24 hours. The mixture was filtered and concentrated. Water was added and the product extracted into ether. The ether solution was washed with base and water, dried and concentrated. The residue was recrystallized from alcohol, giving 3,4-dibenzyloxybenzaldehyde, M.P. 90–93°.

*Example 10*

A slurry of 3,4-dibenzyloxybenzaldehyde (15.9 g.) in methanol (70 ml.) was added to 4 g. of hydrogen cyanide. A saturated solution of sodium cyanide (0.7 ml.) was added to catalyze the reaction. The aldehyde had dissolved after 30 minutes of stirring. Hydrogen chloride (7 g.) was passed in. After standing overnight 350 ml. of ether was added. The crystals that formed were kept overnight in water, then recrystallized from ether. Methyl 3,4-dibenzyloxymandelate, M.P. 73–75° resulted. Additional material was recovered from the original filtrate. Analysis—calculated for $C_{23}H_{22}O_5$: C, 73.00; H, 5.86. Found: C, 73.28; H, 5.89.

*Example 11*

Sixteen grams of methyl 3,4-dibenzyloxymandelate and 6 g. of methylamine in 50 ml. of methanol on standing overnight afforded 3,4-dibenzyloxy-N-methylmandelamide, M.P. 147–148.5° (from alcohol). Analysis—calculated for $C_{23}H_{23}O_6N$: C, 73.19; H, 6.14. Found, C, 73.45; H, 5.85.

*Example 12*

A solution of 6.5 g. of 3,4-dibenzyloxy-N-methylmandelamide in 50 ml. of tetrafluorofuran was added to a solution of 2 g. lithium aluminum hydride in 100 ml. of tetrahydrofuran. The mixture was heated under reflux overnight, cooled and cautiously treated with water. The precipitate was separated and extracted with hot tetrahydrofuran. The filtrates were concentrated and the residue was treated with an ether solution of maleic acid to afford the maleic acid salt of 1-(3′,4′-dibenzyloxyphenyl)-2-methylaminoethanol that was thereupon recrystallized from ethyl acetate and alcohol-ether. It melted at 133–135°. Analysis—calculated for $$C_{32}H_{25}O_3N \cdot C_4H_4O_4$$

C, 67.62; H, 6.10. Found: C, 67.92; H, 6.23.

*Example 13*

A suspension of 479 mg. of 1-(3′,4′-dibenzyloxyphenyl)-2-methylaminoethanol maleate was prepared in 5 ml. of methanol. Four drops of 10% alcoholic hydrogen chloride were added and the mixture was hydrogenated over 250 mg. of 5% palladium-charcoal catalyst. When three equivalents of hydrogen had been consumed, the catalyst was filtered off and the methanol was removed under nitrogen. The addition of ammonia water afforded crystals of DL-epinephrine, or 1-(3′,4′-dihydroxyphenyl)-2-methylaminoethanol.

*Example 14*

A mixture of 479 mg. of 1-(3′,4′-dihydroxyphenyl)-2-methylaminoethanol maleate and 250 mg. of Raney nickel in 10 ml. of ethanol was hydrogenated at atmospheric pressure and room temperature until three equivalents of hydrogen were consumed. The catalyst was filtered off, the filtrate concentrated and treated with ammonia to give crystals of DL-epinephrine.

*Example 15*

Salicyladehyde (71 g.) was added to a solution of 38 g. of potassium hydroxide (85%) in 250 ml. of methanol and 40 ml. of water. Benzyl bromide (100 g.) was added. After a short reflux period, the mixture was neutral to litmus. It was poured into 700 ml. of water. The oil was separated using ether. It was concentrated, dried and distilled to afford 2-benzyloxybenzaldehyde, B.P. 159–164°/1.5 mm.

*Example 16*

2-benzyloxybenzaldehyde was converted to methyl 2-benzyloxymandelate as described in Example 2. The fraction boiling 185–195°/1 mm. was collected. Analysis—calculated for $C_{16}H_{16}O_4$: C, 70.58; H, 5.92. Found: C, 70.46; H, 5.88. Following the procedure of Example 5, methyl 2-benzyloxymandelate was transformed into 2-benzyloxy-N-methylmandelamide which was isolated as a hydrate from ether. The anhydrous product could not be obtained crystalline. The hydrate melted at 70–75°. Analysis—calculated for $C_{16}H_{17}O_3N \cdot H_2O$: C, 66.42; H, 6.62; N, 4.84. Found: C, 66.24; H, 6.55; N, 4.75. Fifteen grams of 2-benzyloxy-N-methylmandelamide hydrate was heated at 110° to remove the water, then dissolved in 100 ml. of tetrahydrofuran and added slowly to a suspension of 3.8 g. of lithium aluminum hydride in 100 ml. of tetrahydrofuran. After refluxing overnight, the mixture was worked up as described in Example 6, to afford 1-(2′-benzyloxyphenyl)-2-methylaminoethanol. This was characterized as the picrate, M.P. 143–145° (from alcohol). Analysis—calculated for $$C_{16}H_{19}O_2N \cdot C_6H_3O_7N_3$$

C, 54.32; H, 4.56; N, 11.52. Found: C, 54.30; H, 4.31; N, 11.62. 1-(2′-benzyloxyphenyl)-2-methylaminoethanol was debenzylated in the presence of a slight excess of hydrogen chloride as already described in Example 8, to afford 1-(2′-hydroxyphenyl)-2-methylaminoethanol.

*Example 17*

4-hydroxybenzaldehyde (100 g.) and benzyl chloride (110 g.) in 250 ml. of alcohol was treated with a solution of 18.5 g. of sodium in 400 ml. of alcohol. After a reflux period of three hours, the mixture was poured into two liters of water. The product, 4-benzyloxybenzaldehyde, was recrystallized from methanol. It melted at 72°. Sixty-four grams of the material was placed in 150 ml. of ethanol with 10.5 g. of hydrogen cyanide. The addition of the cyanide to the aldehyde was catalyzed by 1 ml. of saturated sodium cyanide solution. After a few minutes, hydrogen chloride (20 g.) was passed in. One hour later 500 ml. of water was added and the product was extracted into ether, washed, dried and chilled to afford ethyl 4-benzyloxymandelate, M.P. 92–93°. A portion (14 g.) of the product was heated in 30 ml. of alcohol containing 4 g. of ethylamine for three hours. The solution was concentrated and ether was added to give 4-benzyloxy-N-ethylmandelamide, M.P. 111.5–113.5° (from methanol). Analysis—calculated for $C_{17}H_{19}O_3N$: C, 71.56; H, 6.71. Found: C, 71.53; H, 6.72. Five grams of 4-benzyloxy-N-ethylmandelamide in 20 ml. of tetrahydrofuran was slowly added to 1.5 g. of lithium aluminum hydride in 100 ml. of tetrahydrofuran. After a reflux period of 16 hours, the mixture was worked up as in Example 6, to give 1-(4′-benzyloxyphenyl)-2-ethylaminoethanol. The hydrochloride, recrystallized from methanol, melted at 179–181°. Analysis—calculated for $C_{17}H_{21}O_2N \cdot HCl$: C, 66.33; H, 7.21. Found: C, 66.66; H, 7.48. Debenzylation of this product as previously outlined in Example 14 gave 1-(4′-hydroxyphenyl)-2-ethylaminoethanol.

*Example 18*

3-hydroxy-benzaldehyde (244 g.) was dissolved in 1 l. of methanol and cooled to 0–5°. Sodium cyanide (110 g.) was added with stirring and cooling. Then an amount of hydrogen chloride equivalent to the cyanide used was passed in keeping the mixture cold. After ½ hour another equivalent of hydrogen chloride was passed in allowing the temperature to rise to about 45°. Following ½ hour at this temperature, the solution was refluxed for ½ hour, then concentrated to half volume. Water (100 ml.) was added and sufficient sodium bicarbonate to neutralize the acid present. Butyl acetate (1 l.) was added and the remaining methanol removed by distillation. The solution was then cooled and washed with water, dried with magnesium sulfate, and carbon-treated. The volume was reduced to 700 ml., 200 ml. of benzene was added and the mixture chilled, precipitating methyl 3-hydroxymandelate. An analytical sample was prepared by recrystallization from water. It melted at 131–133°. Analysis—calculated for $C_9H_{10}O_4$: C, 59.34; H, 5.53. Found: C, 59.29; H, 5.66.

We claim:
1. An N-lower alkyl mandelamide substituted in the aromatic ring by from one to two benzyloxy radicals, and having no other substitution in the aromatic ring.
2. N-methyl-3-benzyloxymandelic acid amide.
3. N-methyl-3,4-bis-benzyloxymandelic acid amide.

4. N-methyl-2-benzyloxymandelic acid amide.
5. N-ethyl-4-benzyloxymandelic acid amide.

References Cited in the file of this patent

UNITED STATES PATENTS

| | | |
|---|---|---|
| 2,070,991 | Hund et al. | Feb. 16, 1937 |
| 2,279,745 | Stevenson | Apr. 14, 1942 |
| 2,661,373 | Kulz | Dec. 1, 1953 |
| 2,906,777 | Denss et al. | Sept. 29, 1959 |

FOREIGN PATENTS 206,380    Australia _____ Nov. 17, 1955

OTHER REFERENCES

Nystrom et al.: "Journal American Chemical Society," vol. 70, pages 3738–40, page 3739 relied on (November 1948).

Krajkeman: "Manufacturing Chemist," pages 147–156, pages 150–151 relied on (April 1951).

UNITED STATES PATENT OFFICE
CERTIFICATE OF CORRECTION

Patent No. 3,048,633                                   August 7, 1962

Peter B. Russell et al.

It is hereby certified that error appears in the above numbered patent requiring correction and that the said Letters Patent should read as corrected below.

Column 3, lines 30 and 31, for "powders" read -- powers --; column 4, line 12, for "to residue" read -- to the residue --; line 39, for "ethter" read -- ether --; column 5, line 14, for "$C_{23}H_{23}O_6N$" read -- $C_{23}H_{23}O_4N$ --; line 18, for "tetrafluorofuran" read -- tetrahydrofuran --; line 30, for "$C_{32}H_{25}O_3N \cdot C_4H_4O_4$" read -- $C_{23}H_{25}O_3N \cdot C_4H_4O_4$ --.

Signed and sealed this 21st day of May 1963.

(SEAL)
Attest:
ERNEST W. SWIDER
Attesting Officer

DAVID L. LADD
Commissioner of Patents